Patented Aug. 9, 1932

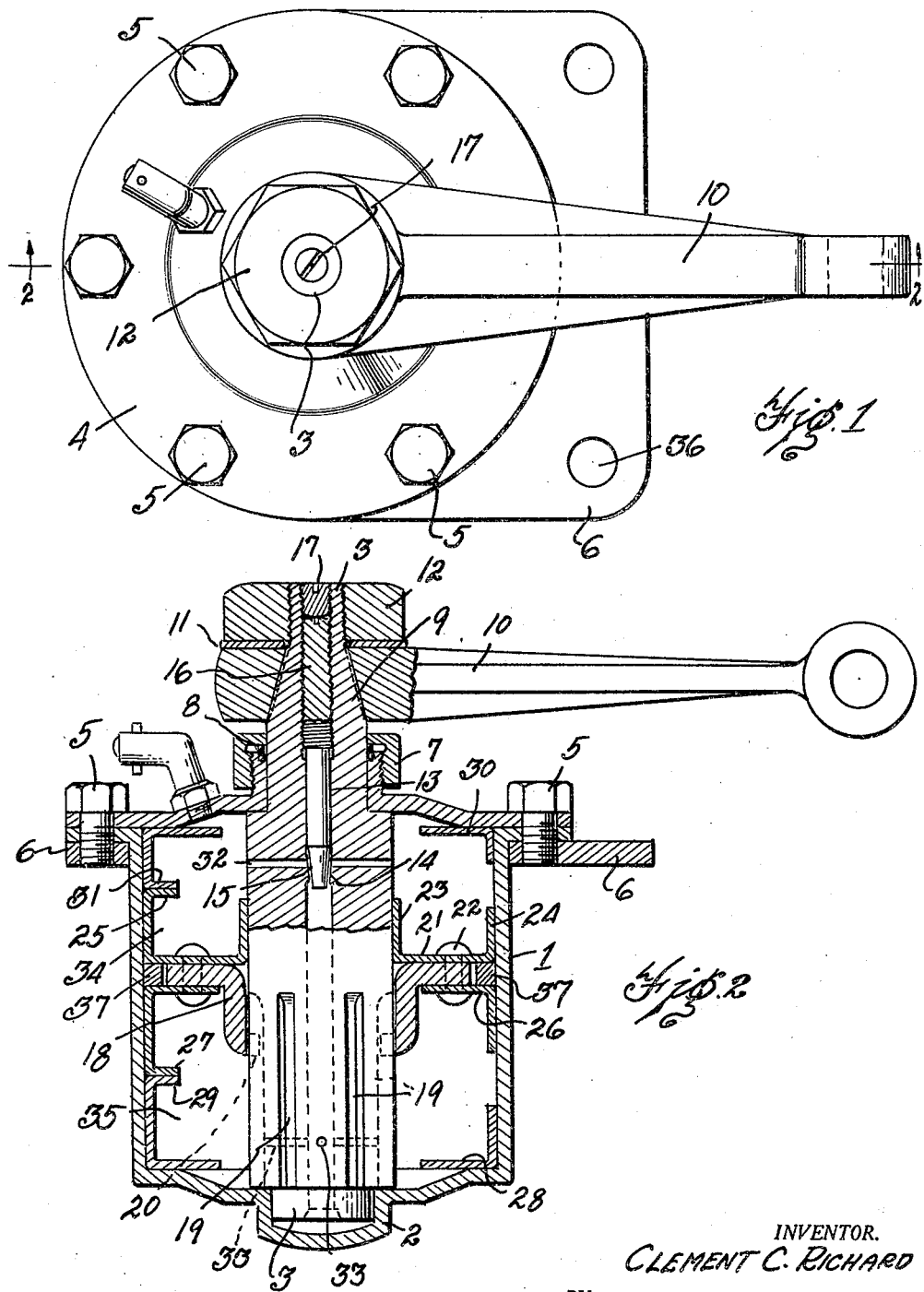

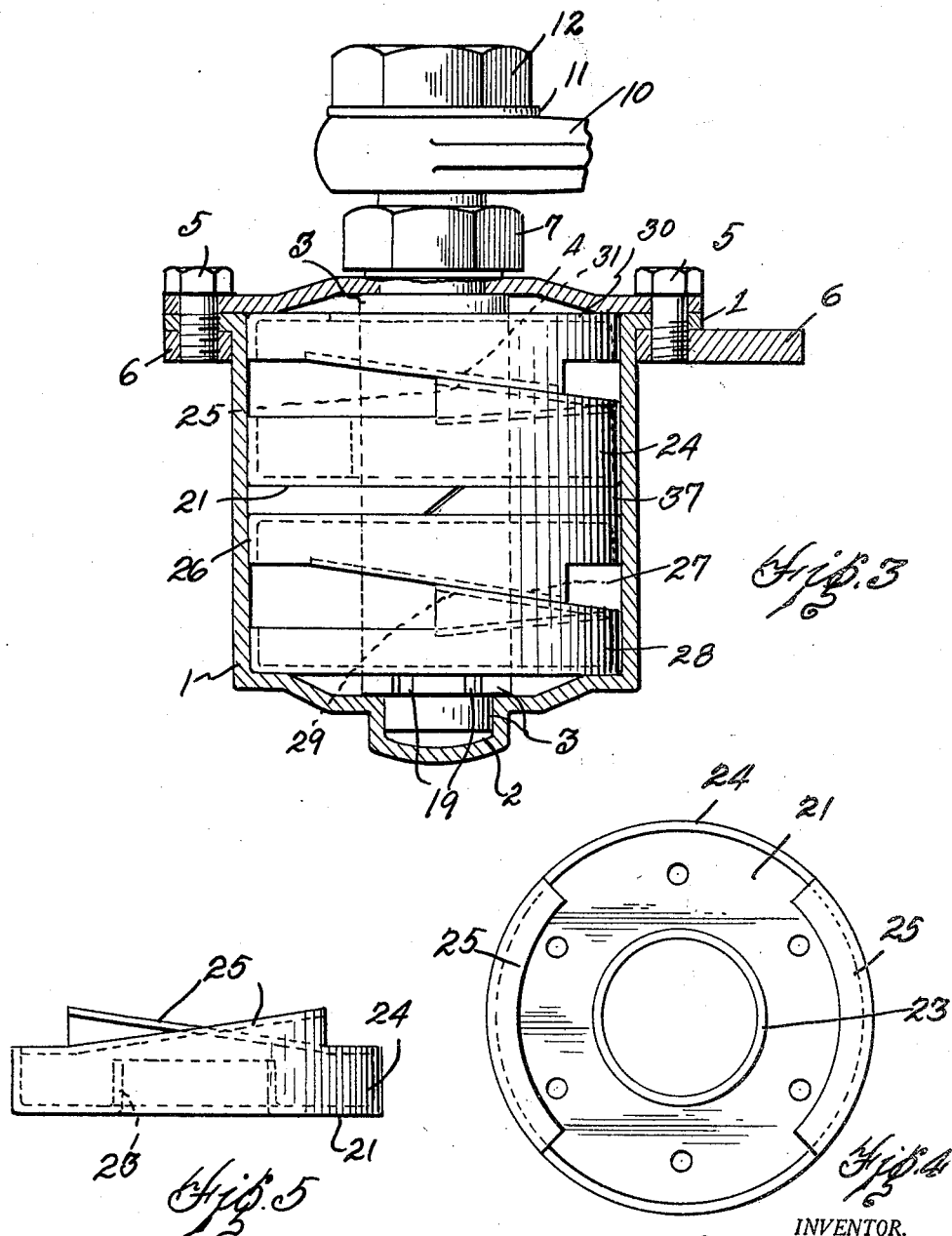

1,870,871

UNITED STATES PATENT OFFICE

CLEMENT C. RICHARD, OF DETROIT, MICHIGAN, ASSIGNOR OF ONE-HALF TO OTIS K. RICHARD, OF DETROIT, MICHIGAN

SHOCK ABSORBER

Application filed May 9, 1929. Serial No. 361,644.

This invention relates to shock absorbers and the object of the invention is to provide a shock absorber for automobiles formed almost entirely of sheet metal parts and arranged to absorb shocks caused by spring bound and rebound.

The structure shown is a hydraulic shock absorber consisting of a casing having a piston therein dividing the casing into two compartments, movement of the piston being resisted by a hydraulic medium transferable from one compartment to the other.

A further object of the invention is to provide a piston having flanged sheet metal members on opposite sides normally riding in engagement with the casing or cylinder wall and held in contact therewith by the pressure of the hydraulic medium, the flanged members providing a space between which a piston ring is mounted to further prevent leakage about the piston.

A further object of the invention is to provide an arrangement whereby as the piston is turned on its longitudinal axis it is moved longitudinally of the casing.

These objects and the several novel features of the invention are hereinafter more fully described and claimed and the preferred form of construction by which these objects are attained is shown in the accompanying drawings in which—

Fig. 1 is a plan view of a shock absorber embodying my invention.

Fig. 2 is a section taken on line 2—2 of Fig. 1.

Fig. 3 is a detail showing the arrangement of the different cams.

Fig. 4 is a plan view showing the construction of one of the cams.

Fig. 5 is a side elevation thereof.

As shown in Figs. 2 and 3 the device comprises a cylindrical sheet metal housing 1 which is stamped from heavy sheet steel and is provided at the lower end with a recess 2 in which the end of the shaft 3 is rotatably mounted. At the opposite end a cap 4 is secured to the housing 1 by the screws 5 which are also threaded into a mounting bracket 6, shown more particularly in Fig. 1. A packing nut 7 is threaded onto the cap 4 and is provided with a packing ring 8 for packing the end 9 of the shaft 3 which is rotatably mounted in the cap 4. The portion 9 of the shaft is conical in form and is provided with longitudinal teeth interengaging with similar teeth in the apertured hub of the arm 10. A lock washer 11 is provided and a nut 12 is threaded onto the extreme end of the shaft 3 to secure the arm 10 to the shaft 3. The shaft 3 is provided with an aperture 13 extending longitudinally therethrough and is provided with a valve seat 14 for the valve member 15.

This valve member 15 is provided with a threaded portion 16 which is threaded into the aperture 13 and a threaded plug 17 is threaded into the end of the shaft 3 to lock the member 16 and valve member 15 in place. The valve member 15 is so set that it is spaced slightly from its seat. The interior of the housing 1 is divided into two compartments by means of a piston 18 which is slidable on the central portion of the shaft 3. The shaft 3 is provided with a series of spline grooves 19 adjacent the lower end thereof and the piston 18 is formed of heavy sheet metal with a series of lugs 20 riding in the spline grooves 19. A sheet metal cam member 21 is secured to the upper face of the piston 18 by the rivets 22, as shown in Fig. 2, and this cam member 21 is provided with a hub flange 23 riding on the cylindrical face of the shaft 3. The cam member 21 is also provided with an outer sheet metal flange 24 which rides in contact with the inner wall of the housing and is provided with a pair of inturned angular flanges or cam faces 25 as shown in Figs. 3, 4 and 5. A similar sheet metal cam member 26 is secured to the lower face of the piston 18 by the rivets 22 except that this member is not provided with a hub but is provided with a pair of sloping cam flanges 27 as shown in Figs. 2 and 3.

A cam member 28 similar to the cam member 26 is positioned in the bottom of the casing 1 and is provided with cam flanges 29 co-acting with the cam flanges 27 as shown in Fig. 3. This member 28 may be secured in the bottom of the housing 1 or may be made a press fit therein so that the cam member 28 will remain stationary. A cam member 30 is secured in the top of the housing 1 in the same manner and is provided with sloping cam flanges 31 co-acting with the cam flanges 25 of the cam member 21 as shown in Fig. 3. The shaft 3, as shown in Fig. 2, is provided with apertures 32 opening through the shaft and valve seat 14 into the central opening 13 and at the lower end of the shaft a series of four openings 33 are provided opening from the central opening 13 through the shaft into the lower compartment 35. The housing 1 is divided on the interior into two compartments 34 and 35 by the piston 18 and these compartments are completely filled with oil.

In operation the device, as shown in Fig. 1, is secured to an automobile chasis by means of bolts extending through the apertures 36 in the mounting plate 6. The outer end of the arm 10 is then connected to the adjacent automobile axle so that upward movement of the axle in relation to the chassis swings the arm 10 upwardly and downward movement of the axle in relation to the chassis swings the arm 10 downwardly.

This movement of the arm 10 is normally about fifteen degrees above and below the horizontal. With both compartments 34 and 35 filled with oil an upward movement of the arm 10 turns the shaft 3 and piston 18 thereon thus carrying the cam members 21 and 26 therewith. These cam members have cam faces 25 and 27 co-acting with companion cam faces 29 and 31 on the stationary cam members and this turning movement of the movable cam members causes the piston to move endwise of the housing during rotation as will be understood from Fig. 2. Upon downward movement of the piston 18 the oil in the chamber 35 passes through the openings 33 in the shaft 3 and through the apertures 32 into the chamber 34. As this is the only way in which the oil can escape from the chamber 35 during compression by the piston it retards movement of the arm 10 and thus acts as a shock absorber. Upon movement of the piston in the opposite direction the flow of oil is reversed so that the device acts as a shock absorber in both upward and downward movement of the automobile body in relation to the axles. By adjusting the valve 15 relative to its seat the flow of oil may be retarded or increased as desired. To prevent leakage of oil about the piston 18 a piston ring 37 is positioned about the periphery of the piston 18 between the cam members 21 and 26 as shown in Figs. 2 and 3 and this piston ring closely fits the inner wall of the housing 1 and tends to prevent leakage past the piston. Practically all of the parts except the shaft 3 and actuating arm 10 are made of sheet metal.

Heretofore a sheet metal casing has not been considered sufficiently strong for use in this type of shock absorber as the oil under the pressure which is applied thereto usually bulges the sheet metal casing out sufficiently as to allow leakage around the piston. However, in my construction it will be noted that the cam members 21 and 26 are also made of sheet metal and that the pressure is applied to these members as well as to the wall of the housing and thus any expansion of the housing wall under pressure is equalized by a similar expansion of the outer walls of the cam members 21 and 26 under pressure so that these walls of the cam members always closely fit the walls of the housing and in combination with the piston ring 37 prevent leakage of oil past the piston. By providing cam members which may expand under pressure to closely fit the wall of the housing it is possible to use sheet metal parts where it is usually necessary to provide castings and it is this feature of the invention which is of the utmost importance in this application.

From the foregoing description it becomes evident that the device is very simple and efficient in operation, provides a two way shock absorber, will not easily get out of order and provides a device which accomplishes the objects described.

Having thus fully described my invention, its utility and mode of operation, what I claim and desire to secure by Letters Patent of the United States is—

1. In a shock absorber, a cup shaped sheet metal housing, a cap secured to the open end of the housing, a shaft rotatably mounted in the housing and cap and extending through the cap, an operating arm secured to the extending end of the shaft, a piston rotatable with the shaft and movable longitudinally thereof, a pair of sheet metal cam members secured to opposite sides of the piston and each having a peripheral lateral flange on one side providing a flexible outer wall fitting the inner face of the housing, a piston ring positioned between the cam members and engaging the wall of the housing, a pair of cam members stationarily mounted in each end of the housing and co-acting with the cam members on the piston, the arrangement being such that movement of the operating arm in one direction turns the shaft and moves the piston longitudinally of the shaft in one direction, and movement of the arm in the opposite direction causes movement of the piston in the opposite direction longitudinally of the shaft, a bypass through the shaft from one side of the piston to the other, and means for regulating flow through the bypass.

2. In a shock absorber, a cylindrical sheet metal housing, a piston mounted in the housing and dividing the housing into two compartments, a pair of sheet metal members secured to opposite sides of the piston and each being cup shaped to provide an outer wall fitting the wall of the housing, each member being provided with inturned portions providing cam faces, a pair of stationary sheet metal cam members mounted in the housing and co-acting with the cam faces on the piston members, a shaft rotatably mounted in the housing, the piston being secured to rotate with the shaft and being movable longitudinally thereof, the arrangement being such that upon rotative movement of the shaft and piston the co-acting cam faces move the piston longitudinally of the shaft, a bypass in the shaft open to both compartments and adjustable means for regulating flow through the bypass.

3. In a shock absorber, a cup shaped sheet metal housing, a shaft rotatably mounted therein, a cap secured to the end of the housing and fitting closely about the shaft, a piston rotatable with the shaft and movable longitudinally thereof, a pair of sheet metal cam members secured to opposite sides of the piston and each having a peripheral lateral flange fitting the inner face of the housing, a pair of cam members stationarily mounted in the housing and having cam faces co-acting with the cam faces of the cam members secured to the piston, the arrangement being such that rotation of the shaft moves the piston longitudinally of the shaft and a piston ring fitting the inner wall of the housing and positioned between the cam members secured to the piston.

4. In a shock absorber, a sheet metal housing, a piston dividing the housing into two compartments, a sheet metal member secured to each side of the piston and having an outer flexible wall fitting against the wall of the housing, a piston ring mounted between the two sheet metal members and engaging the wall of the housing, each sheet metal member being provided with cam faces, a sheet metal cam member in each end of the housing each having cam faces co-acting with the cam faces of one of the sheet metal members on the piston, the arrangement being such that upon rotation of the piston in either direction it is moved longitudinally of the housing in either direction, a bypass leading from one compartment to the other, and adjustable means for regulating flow through the bypass.

5. In a shock absorber, a cylindrical sheet metal housing, a piston movable longitudinally of the housing, a pair of sheet metal cam members secured to opposite sides of the piston and each having an outer flexible wall fitting the wall of the housing, each cam member being provided with cam faces, a pair of stationary cam members mounted in the housing and co-acting with the cam members on the piston, the arrangement being such that upon rotative movement of the piston the cam members move the piston longitudinally of the housing.

6. In a shock absorber, a cylindrical housing, a piston positioned therein and movable longitudinally thereof separating the housing into two compartments, said compartments being adapted to be filled with liquid, a shaft on which the piston is slidable longitudinally and secured thereon in a manner to rotate therewith, a passageway from one chamber to the other through the said shaft, means for restricting rapidity of flow of fluid through the passageway, a pair of cup shaped members secured to the opposite sides of the piston in oppositely disposed relation and open to the chamber in which they are respectively positioned whereby pressure in either chamber may flex the peripheral wall thereof, and a cam member in each chamber, each of said cup shaped members being formed with cam like portions to engage the cams in the respective chambers, the cams and cam like portions being so arranged that rotation of the shaft in either direction causes movement of the piston member longitudinally of the shaft to thereby transfer fluid from one chamber to the other.

In testimony whereof I sign this specification.

CLEMENT C. RICHARD.